UNITED STATES PATENT OFFICE.

JAMES J. HAYWARD, OF BALLSTON, NEW YORK.

LEATHER-DRESSING.

SPECIFICATION forming part of Letters Patent No. 399,893, dated March 19, 1889.

Application filed November 1, 1888. Serial No. 289,755. (Specimens.)

*To all whom it may concern:*

Be it known that I, JAMES J. HAYWARD, a citizen of the United States, residing at the village of Ballston, county of Saratoga, and State of New York, have invented a new and useful composition of matter to be applied to leather and similar substances and to textile fabrics and wood for the purpose of rendering them impervious to water, making them flexible, and adding to their durability and usefulness, of which the following is a specification.

My composition consists of the following ingredients, combined in substantially the following proportions, viz: for the purpose of treating leather, paraffine, twelve ounces; asphaltum, one ounce; gum-camphor, eight ounces; rosin, ten ounces; neat's-foot oil, eight ounces; deodorized naphtha, one gallon. These ingredients are to be thoroughly mingled by agitation.

When other substances than leather are to be treated, it is often desirable to vary the amounts of asphaltum and neat's-foot oil in the above formula, and in some instances to entirely eliminate one and in other instances both of those ingredients. In the treatment of wood, for instance, I increase the amount of asphaltum and omit the neat's-foot oil. In the treatment of paper, except for building purposes, I use neither the asphaltum nor neat's-foot oil, usually. The object of omitting the asphaltum and oil is to prevent an odor being emitted.

In using the above-named composition of matter the leather, cloth, felt, wood, or other substance to be treated should be first freed from all dust and dirt and then soaked in my solution until all that the substance will contain has been absorbed.

By the use of the above composition the leather, felt, cloth, and wood are made waterproof, old-appearing leather is renovated and made soft and flexible, and it will not crack or squeak. Paper treated with my solution becomes impervious to water, and may be used for holding ice-cream, oysters, and other moist or greasy edibles without tearing. Heavy paper so treated becomes more valuable for building purposes. Wood treated by my solution is made water-proof, and is especially valuable in the use of piles and posts which have been dipped in my solution before being driven into the earth.

My invention is particularly useful when applied to carriage-tops, harness, boots, and shoes. These are not only rendered waterproof, but also rendered soft and flexible, and it does not interfere with the polishing—in fact causes the leather to retain its luster longer than it otherwise would.

There is no acid or other ingredient in my solution that can in any way injure the substance treated. In fact, it makes it more durable, being less liable to be acted upon by the elements. A substance so treated is no more inflammable than before.

What I claim as my invention, and desire to secure by Letters Patent, is—

1. The herein-described composition of matter to be used for rendering substances impervious to water, consisting of paraffine, camphor, rosin, and naphtha, in proportions substantially as specified.

2. The herein-described composition of matter to be used for rendering substances impervious to water, consisting of paraffine, asphaltum, camphor, rosin, neat's-foot oil, and naphtha, in proportions substantially as specified.

3. The herein-described composition of matter to be used for rendering substances impervious to water, consisting of paraffine, asphaltum, camphor, rosin, and naphtha, in the proportions substantially as specified.

JAMES J. HAYWARD.

Witnesses:
WILLARD J. MINER,
FREDERICK W. CAMERON.